2 Sheets—Sheet 1.
C. H. GRIFFIN,
Assignor of one-half interest to E. E. DURGIN.
Dressmaker's Square.
No. 8,523. Reissued Dec. 17 1878.
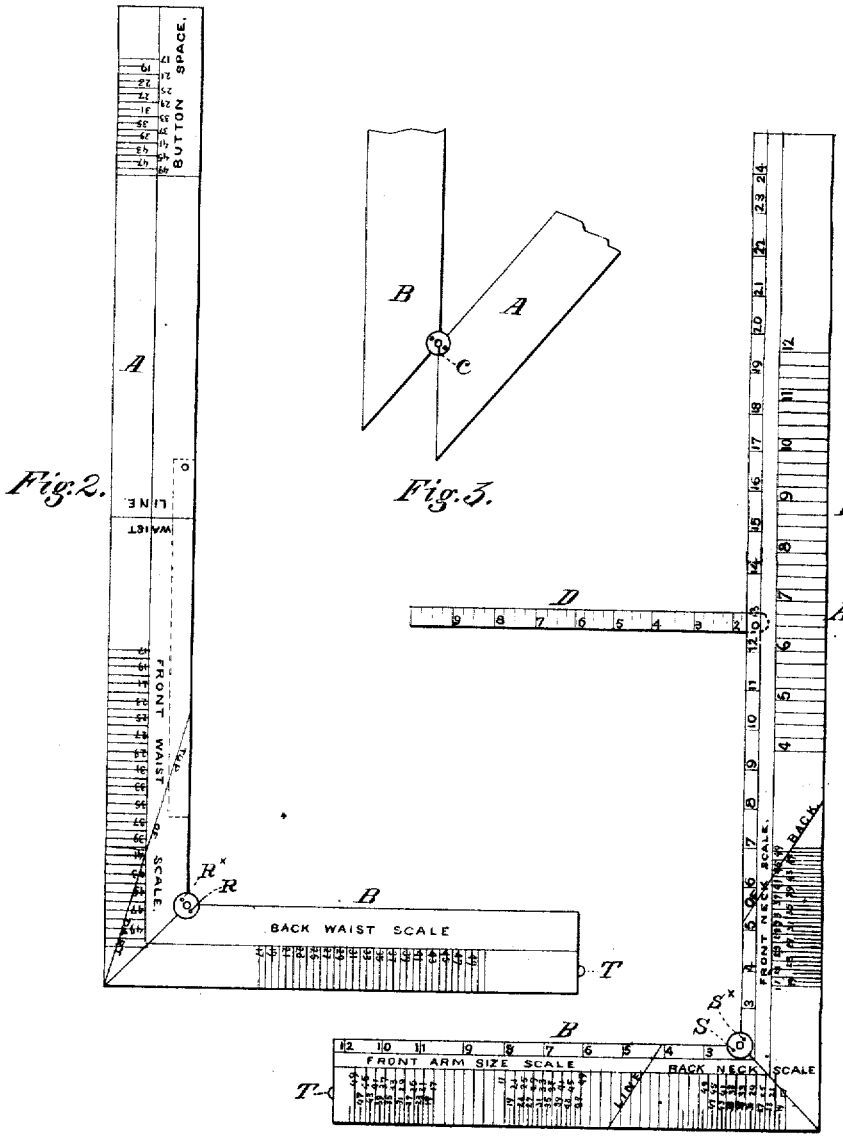
Witnesses:
H. E. Metcalf
Jamy M. Palmer
Inventor:
Caleb H. Griffin
Per C. A. Shaw Atty.
N. PETERS, PHOTO-LITHOGRAPHER, WASHINGTON, D. C.

2 Sheets—Sheet 2.

C. H. GRIFFIN,

Assignor of one-half interest to E. E. DURGIN.

Dressmaker's Square.

No. 8,523. Reissued Dec. 17, 1878.

Witnesses:

H. E. Metcalf

James M. Palmer

Inventor:

Caleb H. Griffin

Per Cashow Atty.

N. PETERS, PHOTO-LITHOGRAPHER, WASHINGTON, D. C.

UNITED STATES PATENT OFFICE.

CALEB H. GRIFFIN, OF BOSTON, MASSACHUSETTS, ASSIGNOR OF ONE-HALF INTEREST TO ELIZABETH E. DURGIN.

IMPROVEMENT IN DRESS-MAKERS' SQUARES.

Specification forming part of Letters Patent No. 195,925, dated October 9, 1877; Reissue No. 8,523, dated December 17, 1878; application filed June 3, 1878.

*To all whom it may concern:*

Be it known that I, CALEB HENRY GRIFFIN, formerly of Lynn, in the county of Essex and State of Massachusetts, but now of Boston, in the county of Suffolk and State of Massachusetts, have invented certain new and useful Improvements in Squares for Drafting Dresses and other Garments, of which the following is a description sufficiently full, clear, and exact to enable any person skilled in the art or science to which my invention appertains to make and use the same, reference being had to the accompanying drawings, forming a part of this specification, in which—

Figure 4:
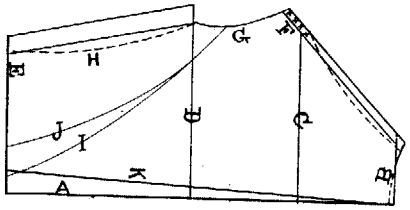
Figure 5:
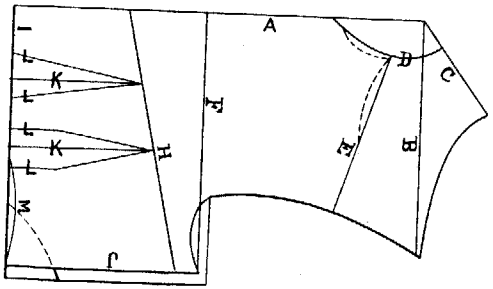

Figure 1 is an elevation showing one side of the square with the bias-scale extended; Fig. 2, an elevation showing the opposite side of the square, the bias-scale being closed; Fig. 3, a sectional view, showing the square set to cut bias; Figs. 4 and 5, diagrams hereinafter referred to, and Fig. 6 a view of the scale-pattern.

My invention relates to that class of squares which are employed by dress-makers and tailors in drafting and cutting dresses and other garments; and consists in a square provided with certain figures, scales, characters, and lines, as hereinafter more fully set forth and claimed, to be used in combination with an ordinary measuring-tape, (not shown,) and, in part, with a curved scale or pattern, (shown in Fig. 6,) affording a simpler and more effective device of this character than is now in ordinary use.

In the drawings, A, Fig. 1, represents the long arm, and B the short arm, of the square, the two arms being provided with inch-scales, and connected by a rule-joint, *c*, at their inner angle. The long arm is provided, on its inner edge, with a bias-scale, D, divided into inches and parts of inches, which may be extended, as seen in Fig. 1, or folded into the square when not in use, as shown by the dotted lines in Fig. 2.

The joint *c* may be omitted, if desired, and the two arms of the square rigidly connected without entirely departing from the spirit of my invention, as the various scales, &c., hereinafter described have no direct relation to the hinging of the two arms, except the scale which I denominate the "bias-scale," and that, when used as a gage for straight-cut strips, is used independently of the joint.

By the employment of the ordinary measuring-tape, and of the lines and scales on my square, (the scales having spaces equally but arbitrarily subdivided, and marked with figures answering to the figures in inches on the tape,) the measurement of the human body above the waist is enabled to be accurately taken, and by points and lines marked therefrom upon a sheet of paper (the points being subsequently connected by lines) diagrams may be formed, which, being cut out in the usual manner, furnish correct patterns, by which the various portions of the upper part of the garment may be cut, constituting one of the most important features of my invention.

Another feature consists in a device for fitting the square to cut cloth on the bias, to use as ruffles, folds, &c.

The principal object of my invention is to simplify the measurements and produce greater accuracy in the patterns employed in cutting garments, more especially the upper portions of ladies' dresses.

Another, but minor, object is to facilitate the cutting of the cloth "on the bias," or diagonally.

In the drawings, in Fig. 1, on the long side A of the square, the "front-neck scale" is seen, marked "Front-neck scale," and consists of thirty-four lines at right angles to the square side, (as are all the scale-lines,) half of these being short lines. The longer lines are marked with figures from 17 to 49, inclusive, omitting the alternate numbers, and the spaces between the lines are about one-eighth inch wide. The measurements by this scale commence at the corner end of the square. The use of this scale is to indicate the height of the neck in front by the breast-measure.

The "back-neck scale" is used to ascertain the distance from the center of the back of the neck to the point of the shoulder. This scale is seen, and so marked, on the short arm of the square, near the corner, and consists of seventeen lines, half of them long and half short, which are marked with figures from 17 to 49, inclusive, omitting the alternate numbers. The spaces between the lines are about one-eighth inch wide. The measurements by this scale commence at the corner end of the square.

The "front-arm-size scale" is also seen and so marked on the short side B of the square. Its use is to determine the outer and inner points of the front-arm sizes. This scale is double, and consists of two scales placed about two inches apart on the short arm B of the square, seventeen lines being drawn to form each half of the scale, and marked, respectively, 17 to 49, (omitting the alternate numbers,) half the lines being short and half long. The measurements by this scale may commence at the center, between its two sections, one inch from the lowest number on each, respectively, or at any desired point between the two. The "line-of-back" line is also seen and so marked on this side of the square. This is a line drawn diagonally across both the long and the short arms of the square, and marked on the short arm of the square "Line," and on the long arm "of back." This line (for which I sometimes substitute dots or other characters) is used by placing it over a line of the pattern defining the back seam of the garment, and using the short side or arm of the square as a guide to draw the line defining the center of the back. The other markings, with one exception, hereinafter noted, are on the other side of the square, and are seen in Fig. 2.

The "button-space scale" is located near the long end of the square, and is so marked. It is composed of seventeen lines, of which one-half are long and one-half short, marked from 17 to 49, inclusive, the alternate numbers being omitted. The measurements by this scale are begun at the nearest end of the long arm of the square. The use of it is to determine the distance between the front edge, at the center of the garment, and the front dart, hereinafter explained, thus showing the proper location of the buttons.

The "waist-line" is a line drawn across the long arm of the square, and is so marked thereon, and is seen at about the center of the same in the drawing. Its use is to form a point of measurement to give, from the size of the waist, the back point of the back dart. The measurements are made with the "front-waist scale." This is a scale so marked on the square, and composed of thirty-four lines, numbered from 17 to 49, inclusive, omitting the alternate numbers, the spaces between being about three-sixteenths of an inch, and the use of this front-waist scale is to determine the size of that part of the garment which is at the front at the waist portion.

The "top-of-darts" line is a line drawn diagonally upon the long arm of the square, near the corner, and is so marked, and its use consists in laying it over the line defining the front edge of the garment, to give, by means of the short arm of the square, the proper course of a line which defines the location of the top of the darts or biases.

The "back-waist scale" is seen on the short arm of the square, and is so marked, and is composed of thirty-four lines about one-fifth of an inch apart, each alternate line being marked with the numbers 17 to 48, inclusive, the alternate numbers being omitted. Its use is to determine the size of the back waist of the garment. The measurement by this scale is begun from the corner of the square.

The "height-of-darts scale" is seen on the side of the square shown in Fig. 1, and is so marked. The use of this scale is to determine the height of the darts or the point above the waist-line to which the darts or biases reach. The measurements of this scale begin at the corner of the square, and the measurements by it begin at a point corresponding with the slope of shoulder, as hereinafter explained. The scale consists of nine lines one and five-thirty-seconds inch apart, or thereabout, and marked respectively, beginning at the end nearest the corner of the square, and numbered 4 to 12, inclusive. The one-and-five-thirty-seconds-inch spaces are subdivided by three other lines, respectively.

I do not confine myself to lines where lines are used, using sometimes dots or any convenient mode of marking, nor to the number of lines in a scale, nor to marking each alternate line in the different scales with figures, as I sometimes mark each line; nor do I confine myself to any special distance between the scale-lines. The measurements made respectively from the corner of the square, or the respective ends of the same, can be readily replaced by any convenient mark upon the square, when the location of the scale upon the square is a matter of no importance; and I sometimes arrange my scales on strips of paper or other substance, of varying lengths, connecting them together like a razor and its blade.

I now proceed to describe the arrangement for cutting the cloth on the bias. It will be noted that in the drawings the two arms of the square are connected together by a hinge or rule joint composed of two circular plates of metal, lying one upon the other, and connected by a rivet. One of the plates is fastened, by a projection attached to it, to the long arm of the square, and the other, by a similar projection, to the short arm. These two plates have each two perforations, R $R^{\times}$, Fig. 2, and S $S^{\times}$, Fig. 1, near the peripheries, respectively, of the circular plates. These holes are so located, as seen in the drawings, as that when the arms of the square are at right angles to each other, the hole $S^{\times}$ (seen in Fig. 1) is opposite to the hole $R^{\times}$ of Fig. 2. A pin or screw is then passed through both the holes, and the arms are thus held firmly at right angles to each other. When it is desired to adjust the scale for cutting bias, the shorter arm (see Fig. 3) is folded toward the longer arm (as the blade of a jack-knife relatively to its handle) until the hole S of Fig. 1 is opposite to the hole R of Fig. 2, when, the pin or screw being inserted, the shorter arm is held firmly at an angle of forty-five degrees to the long arm. In Fig. 1 is seen attached to the inside of the long arm of the square by a rivet, on which it partially rotates, a strip of metal, D, called the "bias-scale," and marked with lines indicating lengths of inches and quarter-inches, or other gradations. This bias-scale, when in use, is placed at right angles with the long arm of the square, as seen in Fig. 1, and when not in use folds up into a slot made for that purpose in the edge of the arm, as seen in dotted lines in Fig. 2. The pin or screw referred to above, when not in use, is placed in a hole bored in the end of the short arm of the square, (see T, Figs. 1 and 2.)

The operation of the invention is best described by my "rules" for taking measures by the dress-maker's square.

1. *Slope of shoulder.*—Pass the tape around back of neck, down front of the arm, then straight back, placing the tape in the place where you want the arm-size, then across the back, so the tape in the center of the back will be as high as the arm-size. Put a pin in center of back at top of tape. Measure from neck-bone to pin. This measure is used to give line D in the back, line F on front, and line H for height of darts.

2. *Length of back.*—Measure from neck-bone to bottom of waist.

3. *Width of back.*—Measure from armpit to armpit.

4. *Size of breast.*—Draw the tape tight across the breast, close up under the arms, and across the back. This measure gives height of neck in front, size of back neck, and front-arm-size points.

5. *Width of shoulder.*—Carry tape even with top of dress on the shoulder-seam to the tip of shoulder. Note this measure, and if you wish it longer, add to the length what you choose for the tip of the shoulder, and line C must give the measure to the tip.

6. *Size of waist.*—As you wish it to be.

7. *Size of chest.*—Measure around the largest part, up under the arms, and across the back, as you wish the dress. For large, corpulent, and fleshy ladies, cast off one inch, and for cloaks and all outside garments take chest-measure one inch smaller than a dress.

8. *Size of neck.*—Take one-half of neck, measuring from neck-bone to center of throat.

9. *Height of darts.*—See height of darts on the square, and use the slope-of-shoulder measure. If seven and a half inches, dot 7½ in dart-scale on the square.

10. *Length of point.*—From neck-bone to bottom of waist.

For example, we take the measure of a lady: first, slope of shoulder, 7½; second, length of back waist, 16; third, width of back waist, 13½; fourth, size of breast, 33; fifth, width of shoulder, 6½; sixth, size of waist, 25; seventh, side seam, 9; eighth, size of chest, 36; ninth, size of neck, 6¾; tenth, height of darts, 14; eleventh, length of point, 20.

Directions for drafting back with dress-maker's square: With long end of square draw line A. With short arm of square draw line B. Dot in back-neck scale 33, which is size of breast. This gives size of back neck. Then on long arm of square dot for line C, which is half the slope of shoulder; then dot 7½ inches for line D from line B, which is the slope of shoulder or lower point of back-arm size, on which dot for width of back, one-half of which is 6¾. Dot for line E 16 inches from line B, which gives length of back. Turn the square over with long arm on line A, and short arm on bottom of waist. Dot in back-waist scale number of the waist, 25, which gives lower point of side seam. Draw line F from size of neck on line B 6½ inches to line C. With scale O draw line G from line C to line D, which forms back-arm size. Draw line H from lower point of back-arm size to line E, line I from line G to waist-line E, one inch from line A. Use back form on scale O to form these lines; or you may use your tape one and three-quarters the width of back. Line I commences at the crossing of lines D and I, and goes to waist-line, one inch back of line I. This is a V, to be taken off the side body. The V is sometimes taken out at the center of the back, one inch at the bottom, and then straight to corner of lines A and B; then carry out width of back on line D, and carry out line G to width of back.

To draft front waist with dress-maker's square, place the square on paper, with short end to the left hand and from you. Draw line A on long side of square. Dot in front-neck scale 33, breast-measure, which gives the height of front neck. Dot in height of dart-scale 7½ inches, the same as slope of shoulder. Draw line B on short end of square, which we call "chest line." Find line on the square marked "Line of back," which is the center of back. Place the line on short end of square at corner of lines A and B, with line on long end of square over line A, and draw line C. Take scale-pattern O; put the point where the inch commences on the dot for front neck; whirl the scale O so that 6¾ inches will come onto line C; draw line D from line C to line A.

To get the shoulder of the front, take the back; place line A of back on line C on the front, with corner of lines B and F of the back on line D of the front. Then place lower point of back-arm size of back on line B of the front, and dot at each end of the shoulder of back. For the front, draw line from dot to dot for line E, taking off one-eighth inch at each end of line E. For spring of shoulder, take out a V from line D half the length of line E. Draw line F by the slope of shoulder 7½ inches, measuring from the top of neck of the front to line F, on which you get size of chest. The chest-measure is 36 inches. Take width of back, 13½ inches, from 36, and you have 22½. One-half of this we take for size of chest on line F—11¼ inches. Take short arm of square; place front-arm-size scale on line F, with long side toward you; place 9 inches on dot for size of chest, and dot each side of 9 in 33, breast-measure, which gives outer and inner points of front-arm size, line G, from line E to line J. To strike this line of front-arm size, place scale-pattern O on at end of line E, with hole in scale-pattern O over dot at line F, inner point of arm-size; draw from line E to line F; turn scale-pattern O so as to form the rest of arm-size to line J. Place line on square marked "Top of darts" over line A, with corner of square on dot on line A for height of darts, and draw line H. Length of point from lines C and D, 19½ inches, for line I, which draw at right angles with line A. Draw line J at right angles with line I to outer point of front-arm size. To get the darts, turn the square over. On long side find front-waist scale. Place 25, which is the size of waist, of the scale on side seam, and dot at waist-line. This gives back point of back dart. Place button-space end of square on line A; dot in 25, size of waist. This gives inner point of front dart. Dot the center of these points for back dart; take the space out of either dart; take the center of each dart for lines K; where they touch line H gives tops of darts. Take scale-pattern O; draw lines L from I to H; get length of side seam for the front by the side seam of the back one-eighth inch shorter; draw curved line with scale-pattern O from back dart to bottom of side seam or line J. This reversed gives V over the hip.

For cloaks: In measuring for these garments we do the same as for a dress. When you make your draft, add three-fourths of one inch to the slope of shoulder and one-half inch to the length of shoulder; take the V out of the center of back one inch to line K, and carry out line D from line K and line G to the width of back.

In the operations just described the bias-scale has been shut up and the arms at right angles to each other.

To cut bias, the desired width of the ruffle or fold is measured on the cloth and marked, and the bias-scale is opened out at right angles with the long arm, which bears it, as seen in Fig. 1. The shorter arm of the square is then placed, by means of the hinge, at an angle of forty-five degrees, and is then fastened by means of the pin or screw T. The outer edge of the long arm of the square is then placed on the cloth, in a line parallel either with the warp or the weft of the cloth, and the side of the short arm is used as guide by which to mark the bias cut.

The graduated lines on the bias-scale afford the exact gage of the desired width of the ruffle.

The bias-scale forms, also, a most convenient gage of width of any straight strips of cloth which it may be desirable to cut when the arms of the square are put at right angles with each other.

I sometimes add a sliding arm, attached to the long arm of the square, and bearing one or more supplementary bias-scales, for use in cutting bias when the cloth is unusually wide or the strip very long.

Figure 6:
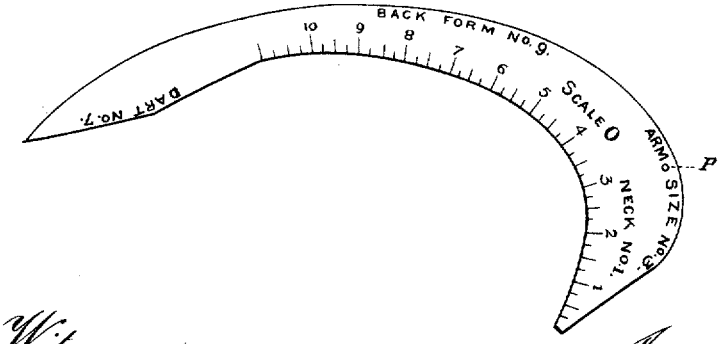

It will be observed that the pattern marked "Scale O" has its sides and ends bounded by peculiar curves, as seen in Fig. 6, and is provided with a perforation, P, and scale marked "Neck No. 1." These sides and ends form sections of the pattern, which may be used independently of each other, in combination with a square and tape-measure, and are essential in cutting a part of the garment. One of these sections is marked "Arm-size No. 3," one "Back-form No. 9," and one "Dart No. 7."

In the use of the pattern, the "front-neck scale" on the square and the "neck-scale No. 1" on the pattern co-operate and the "front arm-size scale" on the square, the "arm-size No. 3" section of the pattern, and the perforation P are co-operative.

I do not, however, herein claim said pattern or either of its sections, or the scale "neck No. 1," when in and of themselves considered, the same having been described in a prior application; but, Having thus explained my improvement, what I claim is—

1. A square having the "front-neck scale," the same being marked with figures or other characters answering to the inches and proportionate parts of inches in the breast-measure, substantially as shown and described.

2. A square having the "back-neck scale," when said scale is constructed to operate substantially as shown and described.

3. A square having the "front-arm-size scale," when said scale is constructed to operate substantially as shown and described.

4. A square having the line herein denominated "line of back" arranged thereon, substantially as shown and described.

5. A square having the "button-space scale," the same being marked with figures or other characters answering to the inches and proportionate parts of inches of the breast-measure, substantially as shown and described.

6. A square having the "front-waist scale," when said scale is constructed to operate substantially as shown and described.

7. A square having the line herein denominated "top of darts" arranged thereon, substantially as shown and described.

8. A square having the "back-waist scale," the same being marked with figures or other characters answering to the inches and proportionate parts of inches in the breast-measure, substantially as shown and described.

9. A square having the "height-of-darts" scale, the same being marked with figures or other characters answering to the inches and proportionate parts of inches in the measure for slopes of shoulder, substantially as shown and described.

10. A jointed square having one or more bias-scales, and marked substantially as shown and described.

11. A square having the joint *c*, holes S S× R R×, and pins T at its inner angle, substantially as shown and described.

12. A square having the "front-arm-size scale" on the body thereof, in combination with the section of pattern marked "Arm-size No. 3," and the perforation P, substantially as shown and described.

13. A square having the scales and lines described, in combination with the perforated scale-pattern marked "Scale O," substantially as shown and described.

CALEB HENRY GRIFFIN.

Witnesses:

C. A. SHAW,

H. E. METCALF.

Correction in Reissue Letters Patent No. 8,523.

It is hereby certified that the within reissued Letters Patent were, by mistake, granted to Caleb H. Griffin and Elizabeth E. Durgin, jointly, and should have been granted to Elizabeth E. Durgin, the assignee of the said Caleb H. Griffin, for the entire interest in said patent, to conform to the assignment dated the 15th day of June, 1878, and duly recorded in the U. S. Patent Office, June 19th, 1878. Liber Y 22, pages 198 and 199.

January 28, 1879.